Aug. 26, 1969   H. LESCURE   3,463,077
FRYING APPLIANCE

Filed July 14, 1967   6 Sheets-Sheet 1

INVENTOR
HENRI LESCURE
BY Young & Thompson
ATTYS.

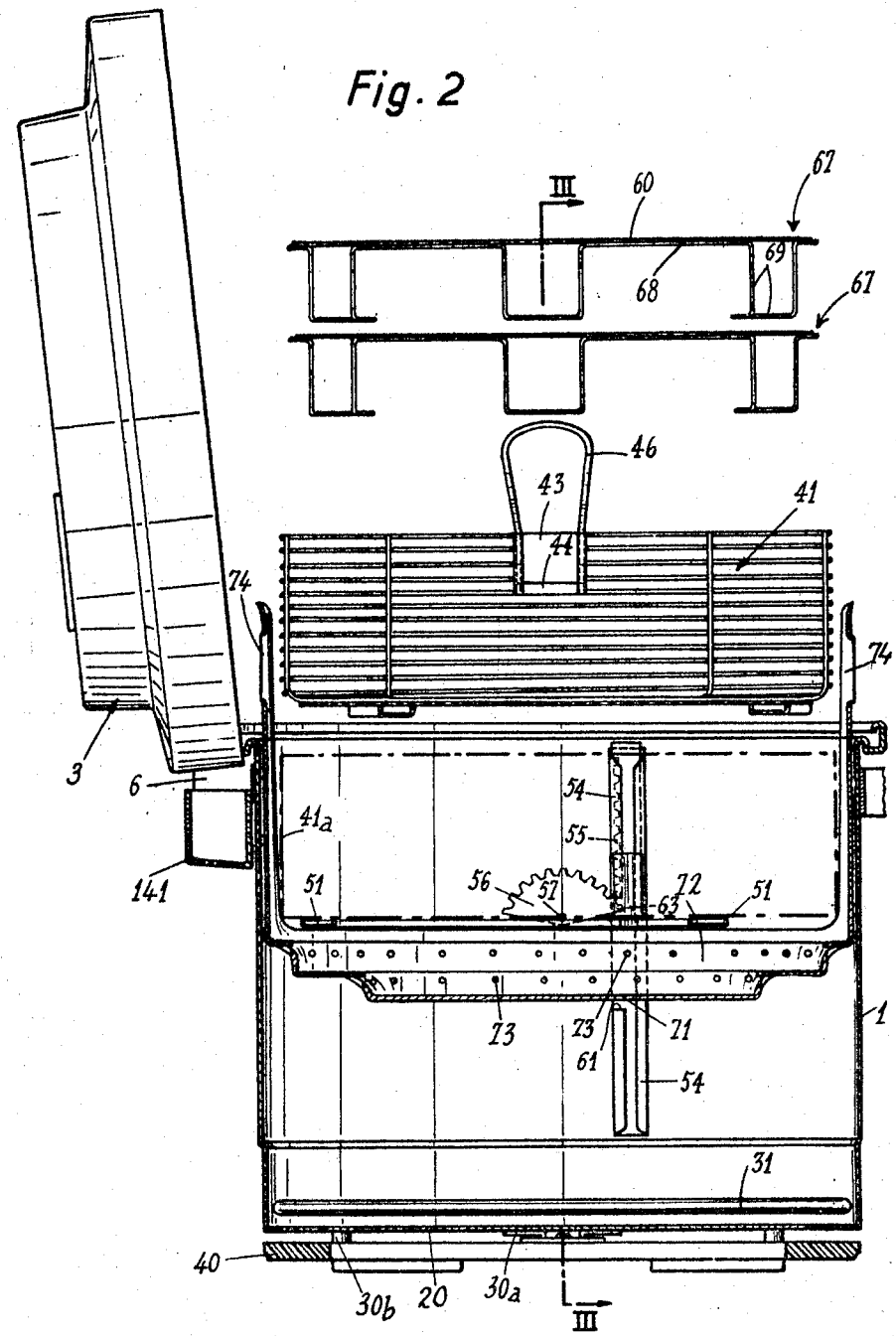

Aug. 26, 1969    H. LESCURE    3,463,077
FRYING APPLIANCE

Filed July 14, 1967    6 Sheets-Sheet 5

INVENTOR
HENRI LESCURE
By Young + Thompson
ATTYS.

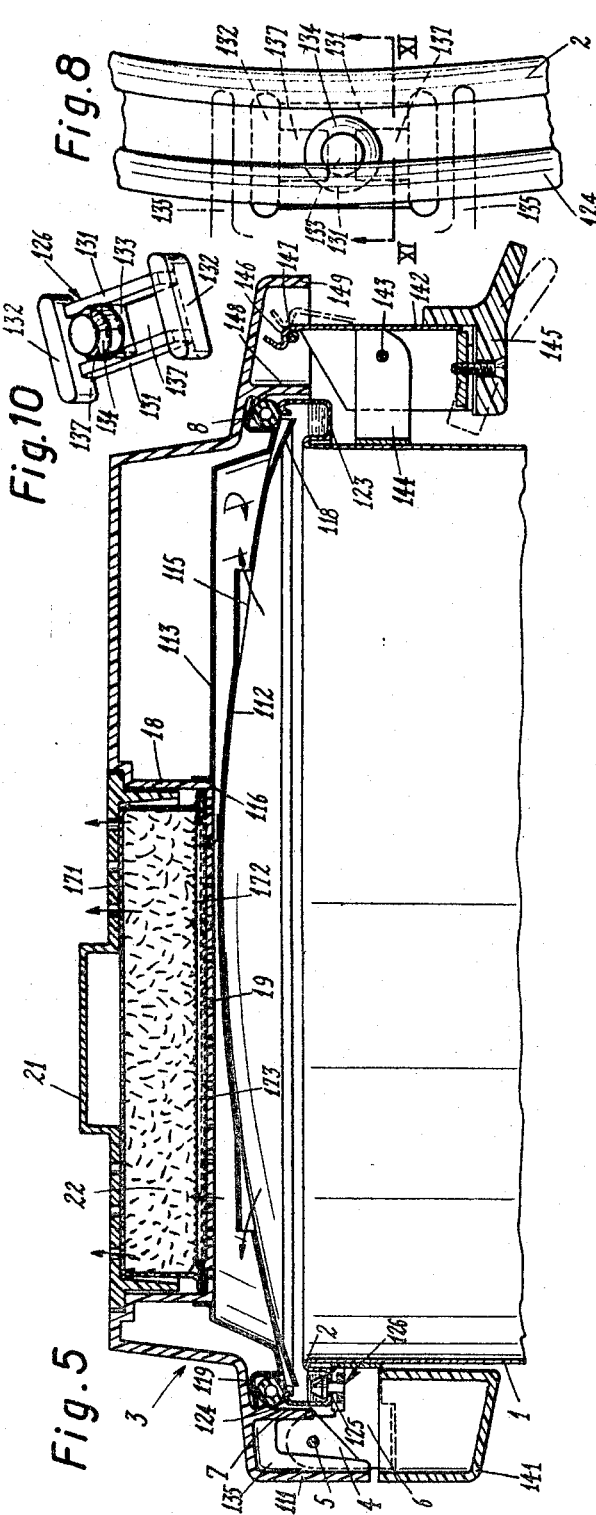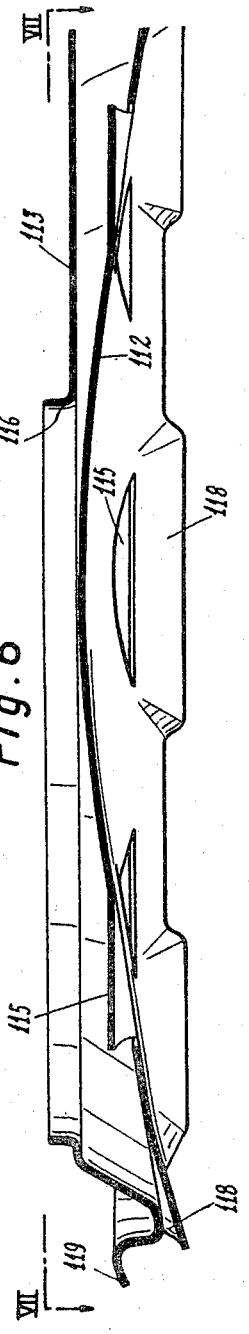

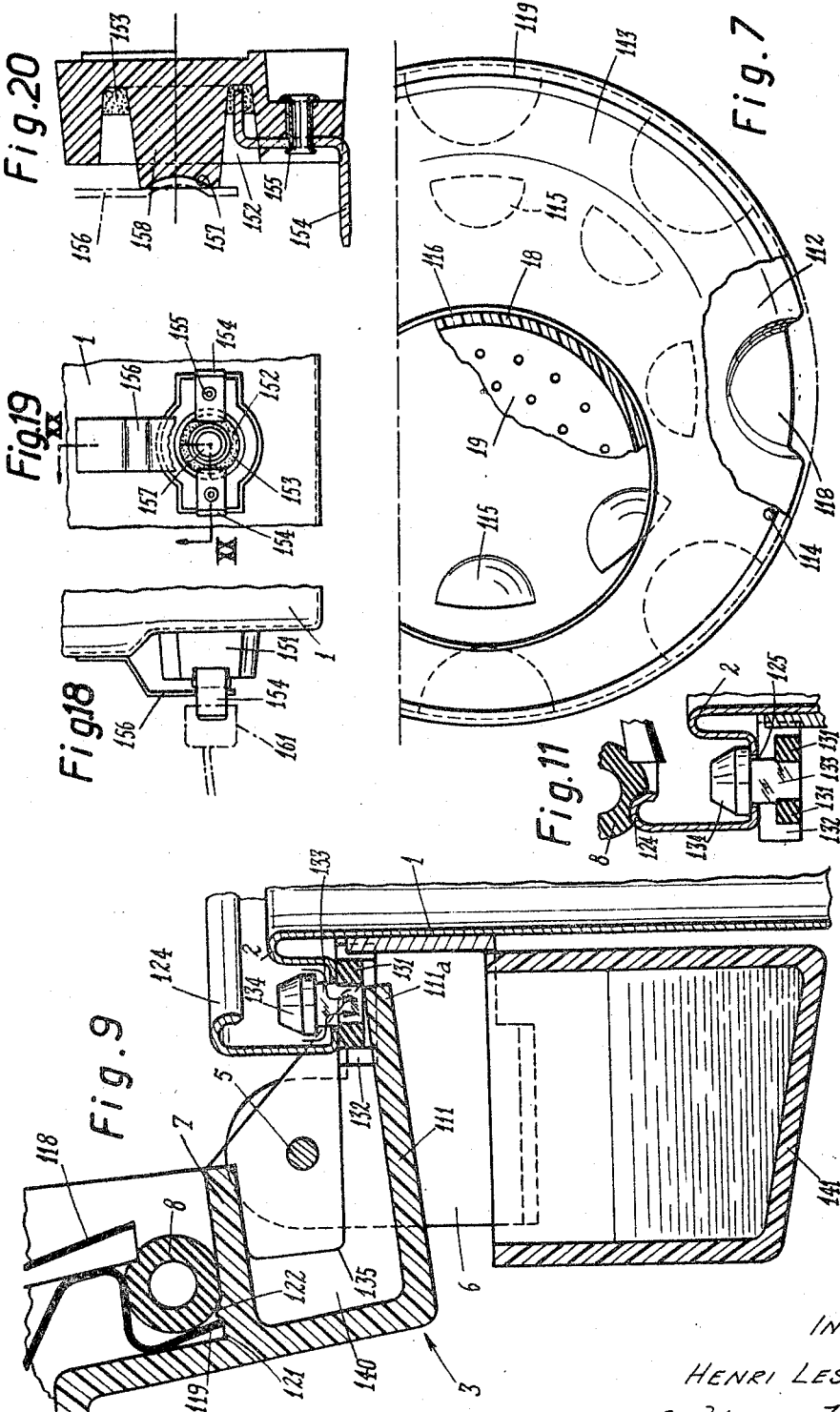

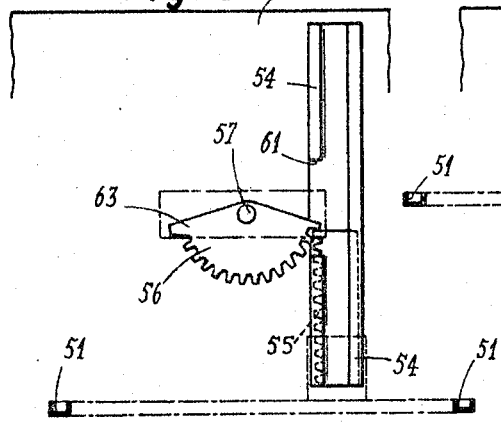
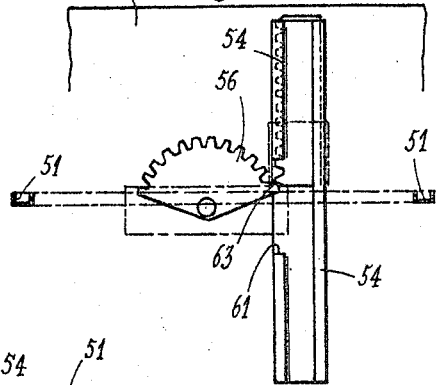
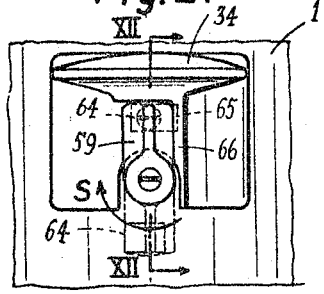
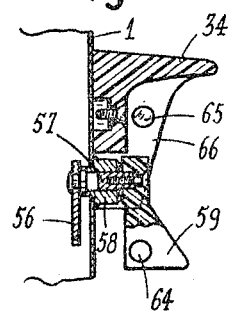
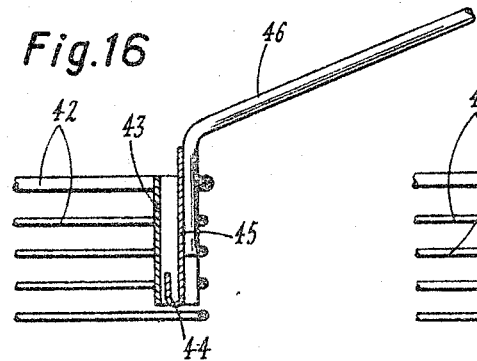
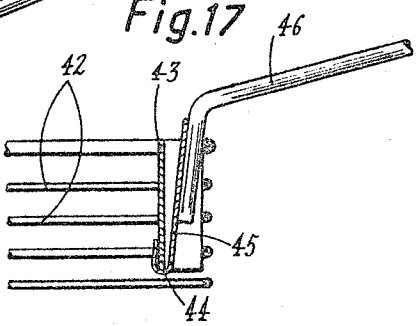

United States Patent Office 3,463,077
Patented Aug. 26, 1969

3,463,077
FRYING APPLIANCE
Henri Lescure, Selongey, France
Filed July 14, 1967, Ser. No. 653,501
Claims priority, application France, July 21, 1966,
70,300; Mar. 1, 1967, 97,036
Int. Cl. A47j 37/12, 27/00
U.S. Cl. 99—403                                17 Claims

ABSTRACT OF THE DISCLOSURE

A frying appliance comprising a container intended to receive the frying oil and characterized in that it comprises a lid arranged fluid-tightly on the rim of the container, closure members allowing the lid to be fixed on the container and a filter accommodated in the lid, allowing communication from the inside of the container with the atmosphere but adapted to deodorise the fumes and vapours. The lid contains a cover arranged inside it, and having vents allowing communication between the space inside the container and space located between the lid and said cover, this latter having moreover a profile which ensures that the condensation water is led off towards the periphery of the cover while the rim of the container has an annular gutter intended to receive the condensation water running off of the cover.

---

This invention relates to an improved frying appliance, in particular of the electrically heated kind.

Numerous types of electrical frying appliances are already known. However hitherto these appliances have not been satisfactory. One disadvantage is that the nature of the oil employed changes quickly and gives it a bad taste. Frequent changing of the oil increases the cost price of the frying appliance.

Furthermore, at the instant when an article of food is dropped into the frying oil, droplets of oil are thrown up causing stains and possibly even burns.

Finally, in general these frying appliances give off unpleasant odours.

It is an object of this invention to obviate these disadvantages.

In accordance with the invention the domestic frying appliance, which comprises a container intended to hold the frying oil, is characterised in that it comprises a lid placed fluid-tightly on the rim of the container, closure members allowing the lid to be fixed on to the container and a filter accommodated in the lid, allowing communication from the inside of the container with the atmosphere but adapted to deodorise vapours and fumes.

The fluid-tight lid associated with the filter prevents any oil from being thrown to the outside and allows the oil to boil in a confined space which is favourable for conserving it. At the same time the filter, while deodorising the vapours, prevents the build-up of any dangerous excess pressure inside the frying appliance. Very favourable operating conditions are thus created.

In accordance with preferred constructions, the lid contains a cover arranged inside it, provided with vents allowing communication between the space inside the container and the space provided between the lid and the said cover, the latter having moreover a profile which ensures that the water condensed on it is led off towards its periphery, whereas the rim of the container has an annular gutter intended to receive the water leaving the periphery of the gutter.

The cover, arranged to condense water and convey it to the annular gutter where it collects, prevents a substantial portion of the water vapour, which is given off by water-containing foodstuff during cooking, passing through the filter and thus detracting from its effectiveness.

The provision of the annular gutter allows an important advantage to be secured. Without the gutter the condensed water would return to the container and accumulate beneath the oil and against the bottom of the container. At intervals the water would vaporize violently, causing spurts of oil and vibration of the container. Experience has shown moreover that frying foodstuffs can disintegrate during the violent vaporisation of such a layer of water. Finally, the lid tends to be lifted by the temporary excess pressures created. A combination of the above-mentioned means obviates these disadvantages.

Preferably the cover for leading off the condensation water has a dished surface, the concavity of which, in the position for use, faces the inside of the container, while the annular gutter is arranged on the outer side of the container wall, the peripheral edge of the cover, in the position for use, being located directly above said gutter. The gutter has at least one aperture for the discharge of water into a detachable basin carried by the container. Discharge of water through the aperture is controlled by an obturator which is opened when the lid is brought to the open position.

An appliance constructed in accordance with the embodiment described hereinafter is pleasant to use and provides operating conditions which are conducive to good cooking.

A specific embodiment of the invention will now be described by way of example with reference to the accompanying drawings, in which:

FIGURE 2 is an axial section of the frying appliance along the line II—II of FIGURE 4, the decanting basket, the frying basket and the grilles of the latter being shown in a partially disassembled position, and the lid, not sectioned, being open.

FIGURE 5 is a view in section along the line V—V of FIGURE 3, showing, enlarged, the upper portion of the frying appliance, fitted with its lid in the closed position.

FIGURE 6 is a view, enlarged, in axial section of the covers detached from the lid.

FIGURE 7 is a part plan view, on a smaller scale, of the preceding members along the line VII—VII of FIGURE 6.

FIGURE 8 is a part plan view of a portion of the gutter and of its rim, provided with the obturator.

FIGURE 9 is a view in axial section, enlarged, showing the portion of the frying appliance situated in the vicinity of the axis of articulation of the lid, the latter being in the open position.

FIGURE 10 is a perspective view of the obturator detached.

FIGURE 11 is a part section along the line XI—XI of FIGURE 8.

FIGURES 12 and 13 are explanatory diagrams showing the device for raising and lowering the frying basket into low and high position.

FIGURE 16 is a part view in lateral elevation showing the frying basket and its operating handle in the course of being set up, the basket being represented sectioned.

FIGURE 17 is a similar view showing the operating handle set up.

FIGURE 18 is a lateral view of the thermal safety device arranged at the base of the container.

FIGURE 19 is the corresponding front view.

FIGURE 20 is an enlarged view of the preceding device detached from the container following the line XX—XX of FIGURE 19.

FIGURE 21 is a similar view to FIGURE 14 showing a variant of the control knob of the frying basket FIGURE 22 is the section along the line XXII—XXII of FIGURE 21.

In the embodiment of the invention which will be described with reference to the accompanying drawings, the frying appliance is of the electrically heated type.

Figure 3:
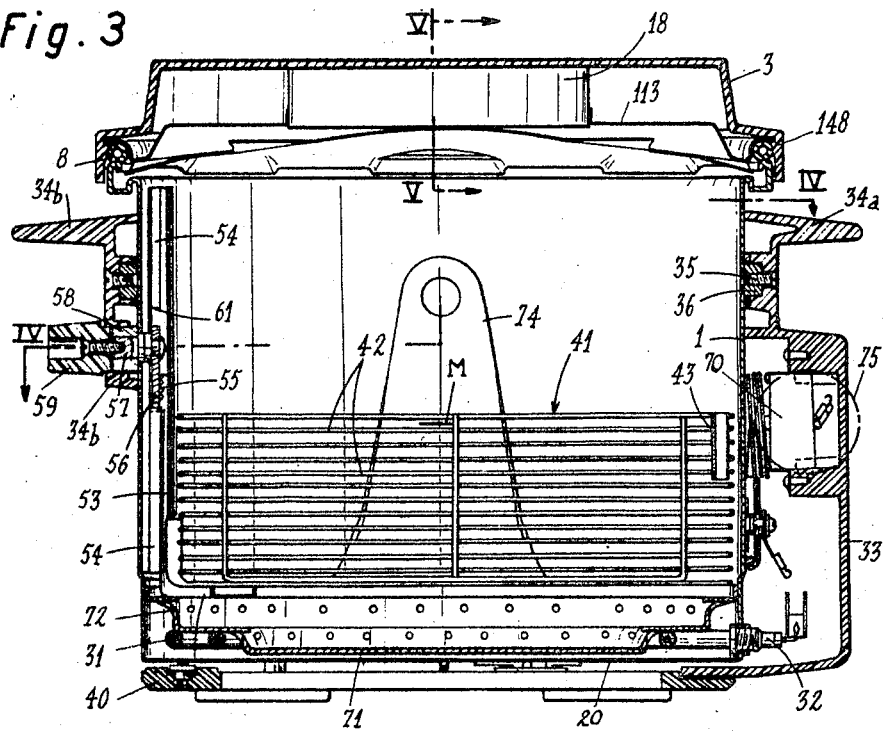
FIGURE 3 is a view in axial section of the frying appliance along the line III—III of FIGURE 2, the lid being closed.

The appliance includes a cylindrical container or body 1 formed for example from an unoxidisable steel sheet which is shaped by stamping. The container 1 has a rounded rim 2 and rests by its bottom 20 on an annular insulating base 40, provided with bosses 30b; this base is screwed on to feet 30a welded on to the body 1. (FIGURES 2 and 3).

The container 1 has a lid 3, for example of moulded plastic material, articulated to it, the articulation consisting of a yoke 4 carried by the lid 3, through which yoke passes a pin 5 which connects it to a second yoke 6 carried by the body of the container 1. The lid 3 has an annular rim 7 which covers the body 2 of the container 1.

The lid 3 comprises a basin 18 with a perforated moulded bottom 19, the basin 18 being closed by a plug 21, also perforated. Inside the basin 18 is situated a material 22 adapted to absorb fumes arising from the hot oil and consisting of, for example, powder or ganules of active charcoal. The material 22 is advantageously contained in a detachable cartridge 171, one of whose faces is perforated and whose other face is taken up by a fine mesh fabric 172 of synthetic material, which is supported by annular beading 173 of the bottom 19, which compels the vapours to pass through the material 22.

The lid 3 carries inside it a dished cover 112 constituting a dome and constructed, preferably, of a good heat conductive metal such as aluminum. A second cover 113 is interposed between the cover 112 and lid 3, the second cover likewise being of a good conductive metal, and fixed to the cover 112 by rivets 114 (FIGURE 7). The components 112 and 113 thus constituting one complete assembly.

The cover 112 is perforated with vents 115 formed by stamping and putting into communication the inner volume of the container 1 with the volume defined by the second cover 113. The latter has in turn an ecentric opening 116 into which the base of the basin 18 is fitted.

The outer diameters of the cover 112 and the second cover 113 are greater than those of the rim 2 of the container 1. Between these two components there is fitted a toroidal joint 8 which bears on the peripheral parts of the cover 112 which is situated between a series of channels 118 formed in the latter by stamping. These channels extend from the side opposite the walls of the vents 115 in relation to the mean surface of the cover 112. The joint 8 is maintained, on the opposite side, by a projecting rim 119 terminating the periphery of the second cover 113.

The joint 8 is thus fitted into the assembly of the components 112, 113, which is forced-fitted inside the rim 7 of the lid 3 so that the rim 119 is fitted into an annular groove 121 provided beyond a boss, likewise annular, 122 (FIGURE 9).

In turn the container 1 comprises beyond the rim 2, annular gutter 123 formed by stamping and the mean diameter of which corresponds substantially to the outer diameter of the channels 118. The gutter 123 is bordered outwardly by a turned-over rim 124 acting as a support for the joint 8 in the closed position of the lid 3. Furthermore there is provided a very slight slope for the bottom of the gutter 123 so that the lowest point of this latter is situated between the walls of the yoke 6. At this place the gutter 123 has an aperture 125 for leading off the condensed water, below the aperture there being disposed a basin 141 arranged detachably between the walls of the yoke 6. The aperture 125 is provided with an obturator 126 of special construction.

The obturator 126 (FIGURES 9 to 11) is entirely constructed of a very supple, natural or synthetic elastomer. It comprises two parallel bars 131 arranged between two lateral cheeks 132, staggered in height in relation to the bars 131, which are joined in addition by a central rod 133 terminated by a frusto-conical valve member 134. The section of the rod 133 is smaller than that of the aperture 125. The valve member 134 is force-fitted into the aperture 125 in such a way that the rod 133 passes through this aperture. When the cheeks 132 come to bear on the bottom of the gutter 123, the bars 131 are situated at a certain distance from the latter and maintain by flexibility the valve member 134 applied against the aperture 125 thus ensuring the fluid-tight closure of this aperture (position in FIGURES 5 and 11). Furthermore the transverse partition 111 of the lid 3 is bordered with two ribs 135 intended to bear against the bottom of the gutter 123 on both sides of the cheeks 132 of the obturator 126 when the lid is in the raised position. The partition 111 and the yoke 4 defines a chamber 140 situated on the outside of the rim 7 of the lid 3.

Figure 1:
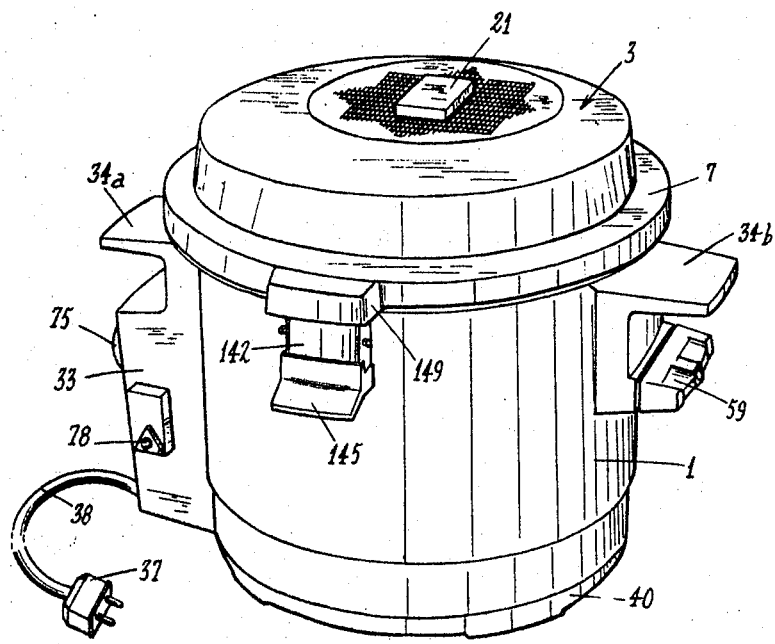
FIGURE 1 is a view in perspective of a frying appliance embodying the invention, in the closed position.

The system for closing the lid 3 comprises (FIGURES 1 and 5) a catch 142 articulated by a spindle 143 on transverse feet 144 fixed beneath the gutter 123. The catch 142 is provided at its lower end with a push member 145 and at its upper end with a lip 146. In the closed position this lip catches on a catch pin 147 accommodated in a chamber 148, produced by casting, with the lid 3 and diametrically opposite the chamber 140. It will be understood that the operation of the push member 145, through pivoting of the lip 146, makes it possible for the latter to catch on the pin 147 or to be disengaged from it. The operation is therefore very quick in both ways. The catch device provided is made possible by the fact that the frying appliance is not intended to operate under pressure.

Figure 4:
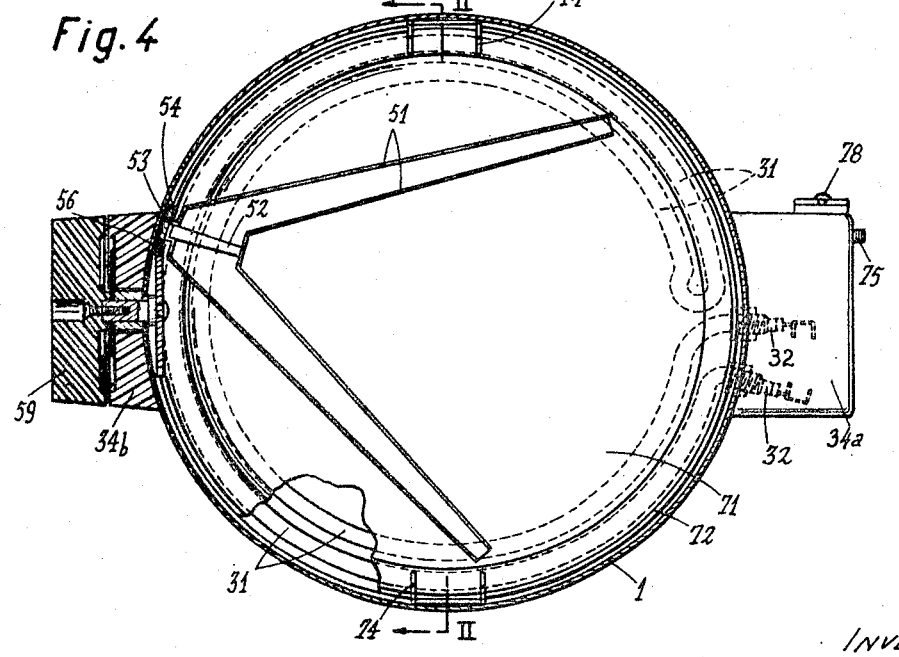
FIGURE 4 is a section along the line IV—IV of FIGURE 3, the frying basket and the thermostat members having been taken out.

In the container 1, and in the vicinity of the flat bottom 20 of the latter, there is arranged a heating resistance 31 of the armoured type and which has a two arm looped circular contour (FIGURE 4). The resistance 31 leads to terminal pins 32 accommodated in a protective insulating box 33 situated on the side of the container 1 and which forms a part of one of the two holding handles 34a. The other handle 34b, of moulded material, is diametrically opposite the preceding one. The handles 34a, 34b are fixed to the container 1 by screws 35 inserted in lugs 36 welded on to the wall of the container 1 (FIGURE 3).

The supply of electric current is ensured by means of a plug 37 and leads 38 connected to the box 33 and connected inside the latter to pins 32 of the resistances 31 through a circuit, not shown, comprising a rotary interrupter combined with an adjustable thermostat 70. This thermostat of the liquid expansion and quick break type, comprises a control knob 75, graduated in temperature (FIGURES 1 and 3), enabling the temperature, for example, to be adjusted between 100 and 180° C.

The box 33 further protects an indicating lamp 78, visible from the outside, arranged in parallel with the resistance 31 and after the thermostat 70.

There is associated with these members a thermal safety device intended to operate in case the thermostat 70 fails. This device likewise accommodated in the box 33, comprises (FIGURES 18 to 20) an insulating cap 151 fixed on to the outer wall of the container 1 and having an annular groove 152 in which there is accommodated a conductive fusible mass 153 in which are immersed two conductive bars 154 fixed by rivets 155 and belonging to the same phase of the supply circuit. These bars are capped, in use, by a removable socket 161. The detachable fastening is assured by a flexible claw 156 disposed on the wall of the container 1 and which is flexibly supported in a hollow 157 provided in the end of a nipple 158 of the cap 151. The fusible material 153 consists of an eutectic alloy which melts at a temperature predetermined for the safety of the oil. If this temperature is reached, in view of the horizontal arrangement of the axis of the cap 151, the material 153 runs from the groove 152 and the electrical connection between the bars 154 is automatically broken. The frying appliance can then no longer function and has to be returned to the manufacturer who will reset the thermostat. This prevents the user from using the frying appliance with a faulty thermostat. To recondition the frying appliance it is sufficient for the manufacturer to remove the cap 151 by lifting the claw 156 and the proceed with the standard exchange of this cap.

Above the resistance 31, there is situated normally inside the container 1 a frying basket 41 for example of lattice-work, of unoxdisable steel, and constituted by an assembly of hoops 42. In the vicinity of the upper edge of the basket 41, and on the inner side, there is arranged a stirrup 43. The latter is intended to receive (FIGURES 16 and 17) the retaining hook 44 terminating the arm 45 of a detachable holding handle 46.

The frying appliance further comprises a control device actuated from outside and enabling the frying basket 41 to be raised and lowered as desired. This device comprises essentially (FIGURES 3, 4, 12, 13) a support fork 51 intended to receive the bottom of the basket 41. The fork 51 is attached by welding to a racked slideway 55 disposed in a guideway with a U-section 54, the latter being situated along the inner wall of the container 1 and parallel to the axis of the latter.

The control device also comprises a segmental pinion 56 integral with a spindle 57 passing through the container at a point situated above the maximum level M provided for the oil in the container. The spindle 57 which is mounted in a sleeve 58 ends in a control knob 59 situated below the handle 34b.

The pinion can engage with the rack 55 on account of an opening 61 provided level with it in the guideway 54.

Figure 14:
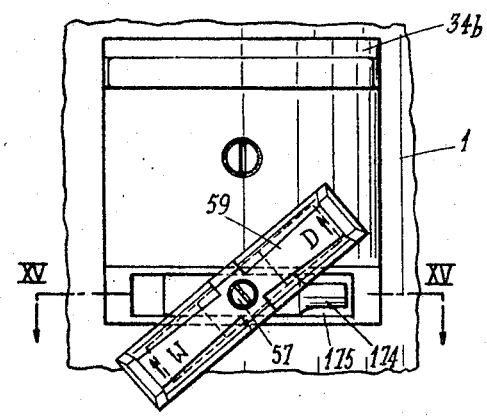
FIGURE 14 is a front view of a handle of the container and of the control knob of the frying basket.
Figure 15:
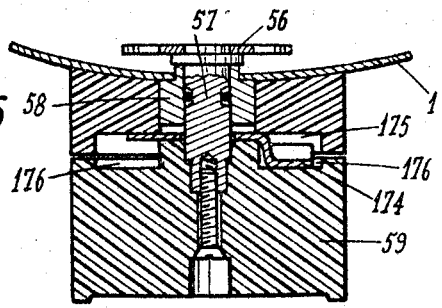
FIGURE 15 is a sectional view along the line XV—XV of the FIGURE 14.

Means are provided for retaining the rack 55, and consequently, the frying basket 41 in the raised position. These means comprise on the one hand (FIGURES 12 and 13) a tooth of greater length 63 terminating the pinion 56 and, on the other hand, mechanical means for locking the control knob 59 when the latter has reached the extreme raised or lowered position of the rack 55. These locking means comprise, in the example in question, a flexible strip 174 (FIGURES 14, 15) which projects out of a recess 175 of the handle 34b and can penetrate into one or other of the two hollows 176 situated facing the control knob 59.

The frying appliance further includes (FIGURE 2) an assembly of superposable grilles 67 each constituting a spiral 60 of inoxidisable steel wires or tin-plated iron wires, placed on radial crosspieces 68. The latter have detachments 69 constituting feet and also forming spacers. There can thus be placed in superposition in the basket 41 several grilles 67 which leave between them sufficient space to insert articles of food to be fried.

It is also provided for the insertion between the frying basket 41 and the heating resistance 31, of a decantation basket 71. The latter has a solid bottom bordered by a low collar 72. Perforations 73 are provided on the periphery of these surfaces. The collar 72 has two holding handles 74.

In the rest position the decantation basket 71 rests directly with its bottom on the resistance 31 and ensures the diffusion of the heat emitted by the latter.

The frying appliance arranged thus is used as follows:

To load the frying basket it is sufficient to open the lid 3 and to turn by hand, following M (FIGURE 14), the control knob 59 to bring it to the horizontal. The segmental pinion 56 engaging with the rack 55 ensures the sliding of the fork 51 in the guideway 54. When the knob 59 is horizontal, the flexible strip 174 comes to be inserted in the recess 176, thus ensuring the locking of this knob and also of the pinion 56. In this position, the rack 55 comes to bear by its last tooth against the projecting tooth 63 of the pinion 56. The basket 41 is then in the raised position represented at 41a (FIGURE 2) and it can be loaded with food to be fried. If it is desired to separate these food articles into several layers, it is sufficient to insert in succession the various grilles 67.

If it is desired to take the basket 41 right out, it is sufficient to insert between the lattice wall of the latter and the stirrup 43, the arm 45 of the handle 46 until the hook 44 of the latter takes a hold on the stirrup 43 (FIGURE 17) the basket can then be released, which is simply placed on the forked support 51, which remains in place.

When the container 1 no longer contains the basket 41, the impurities accumulated in the oil can be removed by lifting the decantation basket 71 by means of handles 74. The oil runs out through the apertures 73 during this operation and only the impurities are taken away with the basket 71.

With normal procedure, the frying operation is effected as follows: the frying basket 41 being locked in the raised position, as mentioned, is filled with food articles to be fried, then the lid 3 is reclosed and kept in position by the catch 142 (FIGURE 5).

The heating resistance 31 is then supplied with current, the thermostat 70 having been adjusted by the control knob 75 to the required temperature. In this circumstance the indicating lamp 78 is alight. The basket remains in the raised position.

When the lamp 78 goes out, the operator is informed, that the required temperature has been reached by the oil. It is necessary to turn the knob 59 half a turn following D which brings the basket 41 to the lowered position. On account of the means provided this operation can be effected without opening the lid.

During the heating and cooking, in view of the fact that the cover 112 is of a good conductive metal, its inner surface is at a relatively high temperature, also in its central as well as peripheral portion and the condensation of steam in these places is slight. Anyway if condensation is produced, in view of the curve of the cover, the drops collect at the periphery from where they drop into the gutter 123.

The non-condensed steam, which collects in the dome formed by the cover 112 passes through the vents 115 in the latter and thus penetrate into the space comprised between this cover and the second cover 113. It has a tendency to condense on these surfaces and the drops trickle towards the periphery and in particular towards the channels 118 from where they drop into the gutter 123. A minimal portion of vapour passes therefore through the perforations 119 which is favourable for maintaining the durability of the activity of the absorbent material 22 which is thus used almost solely for the absorption of fumes, while water is prevented from falling back into the frying oil.

At the end of the cooking, the basket 41 is returned to the raised position, which allows the oil to drain, after which the lid 3 can be opened. The grilles 67 prevent the layers of fried food articles from sticking to one another.

When the lid 3 is in the position in FIGURE 9, the condensed water left on the components 112 and 113 trickles towards the low part of the rim 7 level with the yoke 4 and runs off of this rim towards the chamber 140. At the same time the ribs 135 of the latter rest on the gutter 123, but the terminal edge 111a of the partition 111 comes to be supported on the bars 131 projecting downwards in relation to the cheeks 132.

Thus these bars 131 are bent upwards to come into contact with the bottom of the gutter 123 thus raising the valve member 134. The condensation water then passes between the aperture 125 and the rod 133 then into the openings 137 provided between the bars 131. The water runs partly into the basin 141 and partly into the chamber 140. When the lid 3 is replaced in the closed position, the water in the chamber 140 runs off automatically into the basin 141. It is sufficient then to empty this basin periodically.

The invention also makes it possible to effect the frying in the absence of ambient air, which offers numerous advantages:

The oil does not change in nature by oxidisation and the oil bath can, apart from the periods of utilisation, be conserved in a confined atmosphere.

The immersion of the food articles to be fried in the hot frying oil can be effected with the lid 3 closed thus avoiding spluttering of oil. This immersion can thus be done when the frying oil is at the desired temperature.

The unpleasant frying odours are completely eliminated by the filtering material 22 contained in the lid, without any risk to the user. Moreover as the action of the steam on the filter 22 is avoided, this filter can last, for example, for more than 120 fryings.

The means provided offer moreover a great ease in use, without any risk of stains and permitting very easy adaptation of the mode of cooking to the nature of the food articles.

It is clear that the invention is not limited to the construction described and that there can be introduced into the latter numerous modifications for putting it into effect. Thus the control knob 59 could be kept in the raised position by a magnet 64 (FIGURES 21, 22) incorporated in the body of the knob 59. This magnet cooperates with a back plate 65 of soft iron fitted into a rib 66 provided below the holding handle 34b.

A simplified version of the frying appliance could further be effected in which it would not have a heating resistance 31 and the insulating base 30, the bottom 20 of the container then being able to be placed directly on a gas stove or other external heat source.

What I claim is:

1. A frying appliance comprising a container provided with a rim, said container being arranged to receive frying oil, a lid carried by said container, releasable closure members allowing said lid to be fixed on said container, means for ensuring a fluid-tight contact between said container and said lid when the latter is in closed position, a filter accommodated in said lid allowing communication from the inside of said container with the atmosphere when said lid is in the closed position, said filter containing a filtering material for deodorizing a part at least of the gaseous materials delivered by the frying oil when heated, said lid further comprising a cover arranged inside it and having vents allowing communication between the space inside the container and the space located between said lid and said cover, this latter further having a profile ensuring that the condensation water is led off toward the periphery of the cover whereas said container's rim is bordered by an annular gutter for receiving the condensation water running off said cover.

2. A frying appliance as claimed in claim 1, characterised in that the cover for leading off the condensation water has a dished surface, the concavity of which, in the position for use, faces the inside of the container.

3. A frying appliance as claimed in claim 1, characterised in that the annular gutter is arranged on the outside of the wall of the container, the edge of the cover, in the position for use, being placed directly above said gutter.

4. A frying appliance as claimed in claim 1, characterised in that the cover is made integral with a second cover arranged between it and the lid and which has at least one aperture communicating with the basin of the lid containing the odour filter.

5. A frying appliance as claimed in claim 4, characterised in that the second cover arranged on the cover has an aperture in which there is situated the basin carried by the lid and which contains the filtering material.

6. A frying appliance as claimed in claim 4, characterised in that the cover and the second cover are made of a metal which is a good heat conductor.

7. A frying appliance as claimed in claim 1, characterised in that the cover has a toroidal joint intended to be inserted in a rim of the lid and to come to bear, in the closed position, against a rim of the gutter.

8. A frying appliance as claimed in claim 1, characterised in that the gutter has at least one aperture for leading off the condensation water and in that the container carries a detachable basin situated below said aperture.

9. A frying appliance as claimed in claim 8, characterised in that the aperture for leading off the condensation water is provided with an obturator.

10. A frying appliance as claimed in claim 9, characterised in that the opening of the obturator is controlled by a partition in the open position.

11. A frying appliance as claimed in claim 10, characerised in that the obturator comprises a valve member mounted on an elastically deformable support which normally keeps this valve member in the closed position but lifts it into the open position when it is deformed by the pressure from the partition of the lid.

12. A frying appliance as claimed in claim 1 wherein the inner wall of the container carries a guideway parallel to the axis thereof, said appliance further comprising a support arranged to receive a frying basket, said support being movably connected to said guideway which joins a lower position wherein said support is below the predetermined level of frying oil to be filled to an upper position wherein said support is above said level and control means, operable from the outside of said container, to move said support along said guideway between said two positions.

13. A frying appliance as claimed in claim 12 wherein said support control means comprise means to releasably fix said support in said upper position.

14. A frying appliance as claimed in claim 12 wherein said support control means comprise a spindle passing through the wall of said container, said spindle carrying on the inside of said wall a pinion in mesh with a rack attached to said frying basket support and on the outside of said wall a control knob, means to immobilize said frying basket support in its upper position, said means comprising on the other hand a tooth on said pinion projecting relatively to the other teeth thereof and acting as an abutment for said rack, and on the other hand locking means for locking said control knob when it is brought into the position corresponding to the upper position of said frying basket support.

15. A frying appliance as claimed in claim 1 wherein said container contains in the vicinity of its bottom a heating element constituted by an armored heating resistance, and a removable decanting basket having a perforated lateral wall provided with two holding handles, said decanting basket being arranged for directly resting by its bottom on said armored heating resistance.

16. A frying appliance comprising a container provided with a rim, said container being arranged to receive frying oil, a lid carried by said container, releasable closure members allowing said lid to be fixed on said container, means for ensuring a fluid-tight contact between said container and said lid when the latter is in closed position, a filter accommodated in said lid allowing communication from the inside of said container with the atmosphere when said lid is in the closed position, said filter containing a filtering material for deodorizing a part at least of the gaseous materials delivered by the frying oil when heated, said filtering material being in the form of a detachable cartridge the walls of which are pervious to air and which is filled with active charcoal, said cartridge being disposed in a basin provided in the lid of the frying appliance and closed by a detachable plug.

17. A frying appliance comprising a container provided with a rim, said container being arranged to receive frying oil, a lid carried by said container, releasable closure members allowing said lid to be fixed on said container, means for ensuring a fluid-tight contact between said container and said lid when the latter is in closed position, a filter accommodated in said lid allowing communication from the inside of said container with the atmosphere when said lid is in the closed position, said filter containing a filtering material for deodorizing a part at least of the gaseous materials delivered by the frying oil when heated, said container having an articulated closure catch provided with a lip capable of pivoting and which thus hooks onto a catch pin of the lid by elastic deformation.

References Cited

UNITED STATES PATENTS

| | | | |
|---|---|---|---|
| 2,001,352 | 5/1935 | Princiotta | 99—410 |
| 2,785,277 | 3/1957 | Jepson | 99—403 |
| 2,999,559 | 9/1961 | Boyer | 220—44 |
| 3,232,214 | 2/1966 | Aske | 99—347 |
| 3,343,345 | 9/1967 | Carolan | 99—347 |

ROBERT W. JENKINS, Primary Examiner

U.S. Cl. X.R.

99—408, 410, 444